(12) United States Patent
Cleveland et al.

(10) Patent No.: US 7,864,885 B2
(45) Date of Patent: Jan. 4, 2011

(54) MULTIPLE INPUT MULTIPLE OUTPUT (MIMO) TRANSCEIVER WITH POOLED ADAPTIVE DIGITAL FILTERING

(75) Inventors: Joseph R. Cleveland, Murphy, TX (US); Eran Pisek, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 787 days.

(21) Appl. No.: 11/599,762

(22) Filed: Nov. 15, 2006

(65) Prior Publication Data

US 2008/0112470 A1 May 15, 2008

(51) Int. Cl.
*H03K 9/00* (2006.01)
(52) U.S. Cl. .............. 375/316; 375/219; 375/229; 375/232; 375/347; 375/260
(58) Field of Classification Search ........... 375/316, 375/219, 229, 232, 347, 260
See application file for complete search history.

(56) References Cited

U.S. PATENT DOCUMENTS

| | | | |
|---|---|---|---|
| 7,110,727 B2* | 9/2006 | Dekker | 455/91 |
| 7,203,511 B2* | 4/2007 | Trachewsky et al. | 455/522 |
| 7,212,569 B1* | 5/2007 | Clark | 375/233 |
| 7,333,540 B2* | 2/2008 | Yee | 375/232 |
| 7,346,104 B2* | 3/2008 | Yu et al. | 375/233 |
| 7,486,747 B1* | 2/2009 | Bagley et al. | 375/324 |
| 2004/0047403 A1* | 3/2004 | Choi et al. | 375/148 |
| 2004/0105489 A1* | 6/2004 | Kim et al. | 375/140 |
| 2004/0131011 A1* | 7/2004 | Sandell et al. | 370/210 |
| 2004/0161059 A1* | 8/2004 | Andrieu | 375/341 |
| 2006/0109938 A1* | 5/2006 | Challa et al. | 375/347 |
| 2006/0281422 A1* | 12/2006 | Pan et al. | 455/127.1 |
| 2007/0004465 A1* | 1/2007 | Papasakellariou et al. | 455/571 |
| 2007/0104253 A1* | 5/2007 | Luo et al. | 375/148 |
| 2008/0250093 A1* | 10/2008 | Zhu et al. | 708/316 |

OTHER PUBLICATIONS

Phoel, "Performance of coded DS-CDMA with pilot-assisted channel estimation and linear interference suppression", IEEE Transactions on Communications, vol. 50, Issue 5, May 2002 pp. 822-832.*
Kim, "A constrained MMSE receiver for DS/CDMA systems in fading channels", IEEE Transactions on Communications, vol. 48, Issue 11, Nov. 2000 pp. 1793-1796.*

(Continued)

*Primary Examiner*—Juan A Torres (57) ABSTRACT

A multiple input, multiple output (MIMO) transceiver includes a reconfigurable pooled digital filter. A processor sets parameters of the filter to minimize the number of instructions per second and the amount of power required by the filter to perform, while matching the filter to at least one of: a transmitter filter and a receiver filter. The processor uses an algorithm or a lookup table stored in memory to select the combination of filter parameters. The parameters may be selected from at least one of: a number of taps, a filter length, a word length, a coefficient quantization, a sampling rate, bits per sample, a sampling bit, a tap delay and a coefficient length. After selecting a combination of filter parameters, the processor sends a control signal to the adaptive filter. The pooled adaptive filter reconfigures itself in accordance with the selected filter parameters.

24 Claims, 9 Drawing Sheets

OTHER PUBLICATIONS

Liang, "Channel Estimation Using Adaptive Filters in MIMO-OFDM Systems", International Conference on Wireless Communications, Networking and Mobile Computing, 2006, WiCOM 2006, Sep. 22-24, 2006 pp. 1-4.*

Choi, "Adaptive filtering-based iterative channel estimation for MIMO wireless communications", IEEE International Symposium on Circuits and Systems, 2005, ISCAS 2005, May 23-26, 2005 pp. 4951-4954 vol. 5.*

Goel, "Dynamic algorithm transforms for low-power reconfigurable adaptive equalizers", IEEE Transactions on Signal Processing, vol. 47, issue: 10, Publication Year: 1999, pp. 2821-2832.*

Long, "Low-power CDMA multiuser receiver architectures" 1999 IEEE Workshop on Signal Processing Systems, 1999, SiPS 99, Publication Year: 1999, pp. 493-502.*

Tschanz, "A low-power, reconfigurable adaptive equalizer architecture" Conference Record of the Thirty-Third Asilomar Conference on Signals, Systems, and Computers, 1999, vol. 2 Publication Year: 1999, pp. 1391-1395 vol. 2.*

Goel, "Low-power equalizers for 51.84 Mb/s very-high-speed digital subscriber loop (VDSL) modems", 1998 IEEE Workshop on Signal Processing Systems, 1998, SIPS 98, Publication Year: 1998, pp. 317-326.*

* cited by examiner

MULTIPLE INPUT MULTIPLE OUTPUT (MIMO) TRANSCEIVER WITH POOLED ADAPTIVE DIGITAL FILTERING

TECHNICAL FIELD OF THE INVENTION

The present application relates generally to wireless communication networks and, more specifically, to multiple input, multiple output (MIMO) transceiver systems.

BACKGROUND OF THE INVENTION

Modern communications demand higher data rates and performance. Multiple input, multiple output (MIMO) antenna systems, also known as multiple-element antenna (MEA) systems, achieve greater spectral efficiency for allocated radio frequency (RF) channel bandwidths by utilizing space or antenna diversity at both the transmitter and the receiver, or in other cases, the transceiver.

MIMO transceivers typically include fixed pulse-shaping filters such as, for example, root-raised cosine (RRC) or finite impulse response (FIR) filters. Such filters are designed to provide most of the channel-selection filtering in the digital domain. Thus, such filters eliminate the need for an intermediate frequency (IF) stage, but increase inter-chip interference (ICI) for low selectivity.

There is therefore a need for efficient transceiver filters for use in MIMO systems. More particularly, there is a need for reconfigurable digital filters for MIMO transceivers that reduce processing power and power dissipation for multiple MIMO streams.

SUMMARY OF THE INVENTION

The present disclosure provides a technique for pooled adaptive digital filtering to reduce signal processing requirements for use in multiple input, multiple output (MIMO) transceivers.

In one embodiment, a method for providing adaptive digital filtering for use in a wireless transceiver is provided. The method includes selecting a combination of filter parameter values according to a channel estimation algorithm. The method also includes configuring a filter according to the combination of filter parameter values. The method further includes matching the filter to at least one of: a receiver filter and a transmitter filter.

In another embodiment, a multi-input, multi-output (MIMO) transceiver filter for use in a wireless communication system is provided. The filter includes a processor to select a combination of filter parameter values according to signal strength information and to match a MIMO receiver filter to a MIMO transmitter filter. The filter also includes a reconfigurable filter pool to filter a signal according to the combination of filter parameters.

In still another embodiment, a transceiver filter for use in a multi-input, multi-output (MIMO) system is provided. The filter includes a processor to select a combination of filter parameter values according to a channel estimation algorithm and to match a receiver filter to at least one of: a MIMO receiver filter and a MIMO transmitter filter. The filter also includes a reconfigurable filter pool to filter a MIMO stream according to the combination of filter parameters.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
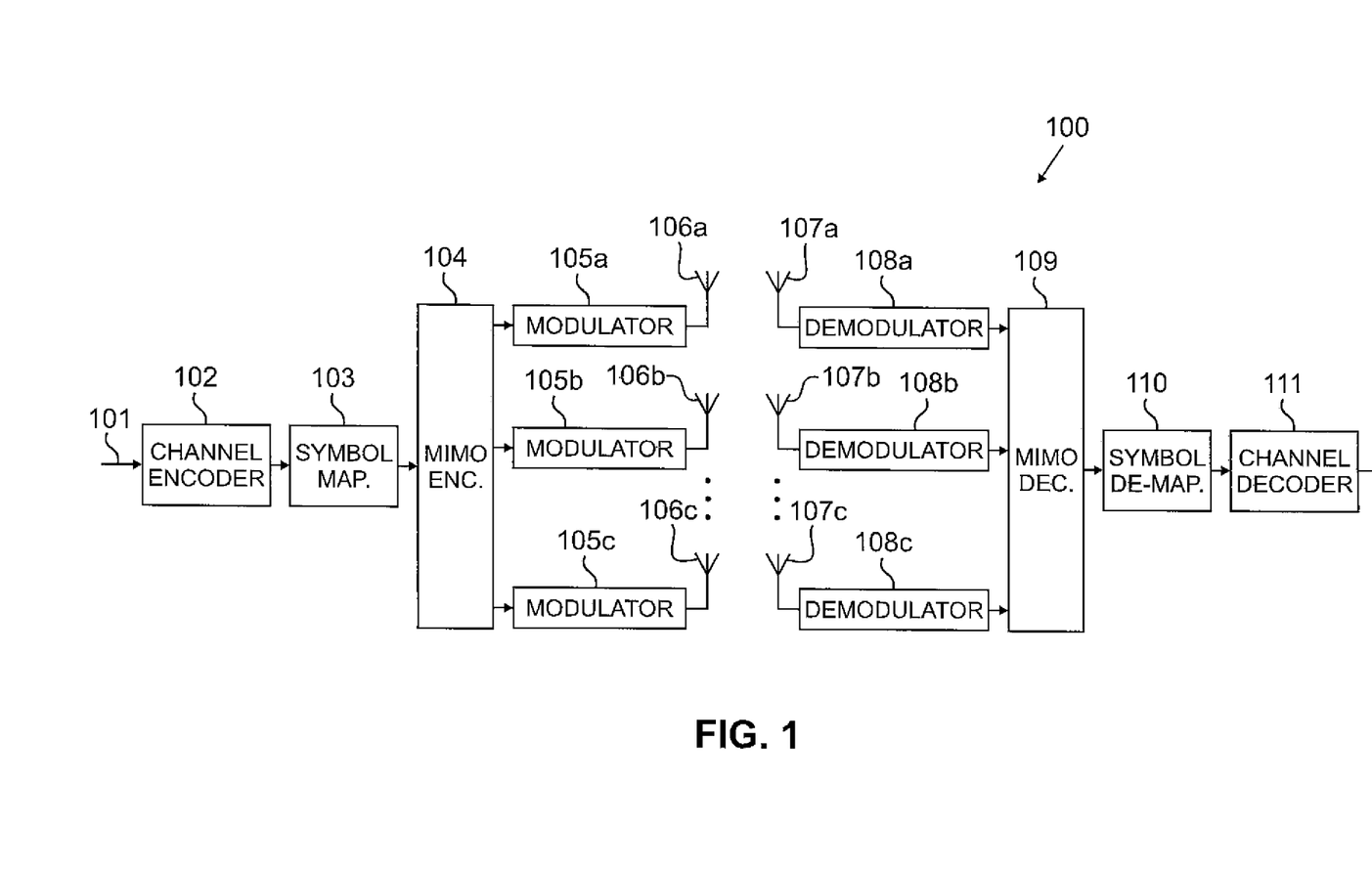
FIG. 1 illustrates a conventional multiple input, multiple output (MIMO) system.

FIG. 1 illustrates a conventional multiple input, multiple output (MIMO) system 100. Input data stream 101 from a single user is encoded by channel encoder 102. After passing the encoded signal through symbol mapping module 103, the signal is passed to MIMO encoder 104. MIMO encoder 104 demultiplexes the signal into $n_T$ separate sub-streams. Each of the $n_T$ substreams are fed into one of modulators 105a, 105b and 105c (collectively referred to herein as modulator 105). Each of the $n_T$ substreams are transmitted out of one of transmit antennas 106a, 106b and 106c (collectively referred to herein as transmit antenna or transmitter 106), where each transmit antenna is associated with a respective modulator 105.

Each sub-stream transmitted by transmitter 106 is received by one of $n_R$ receive antennas 107a, 107b and 107c (collectively referred to herein as receive antenna or receiver 107). Each receive antenna or receiver 107 is coupled to one of demodulator 108a, 108b and 108c (collectively referred to herein as demodulator 108). Each sub-stream is decoded in MIMO decoder 109 then encoded into channel symbols in symbol de-mapping module 110 and channel decoder 111. The same data rate may be implemented on each transmitter 106. Different adaptive modulation rates, however, may be utilized on each of the $n_T$ sub-streams.

With this transmission scheme, MIMO system 100 exhibits a linear increase in spectral efficiency. MIMO system 100 includes a rich scattering environment where the signals from each individual transmitter 106 appear highly uncorrelated at each receiver 107. The signals corresponding to each of the $n_T$ transmitters 106 attain different spatial signatures at each of the $n_R$ receivers 107 when the signals are conveyed through uncorrelated channels between transmitter 106 and receiver 107. Receiver 107 may use different spatial signatures to simultaneously separate the signals that originate from a different transmitter 106 at the same frequency. Thus, the filtering requirements for each signal stream are not necessarily identical.

To minimize inter-symbol interference (ISI) and adjacent channel interference for each signal stream, the same digital filter processing is not required. Conventional adaptive filtering reduces the processing complexity on single received signals, but does not reduce the processing or hardware required for filtering multiple received signal streams, each with a different signature as required in MIMO system 100.

Receiver 107 may include a filter (not shown) generally having several conflicting attributes such as, for example: (1) a low bandwidth; (2) low ISI; (3) low noise figure; (4) high adjacent channel interference rejection; and (5) low power consumption. Conventional receivers 107 fail to include optimized filters for a combination of particular signal waveforms, emission constraints, noise, adjacent channel interference and anticipated propagation channels. Optimizing conventional transmitter-to-receiver chain performance is often hindered by the complex relationship between the symbol waveform, the transmitter and receiver filter shapes and the received bit error rate (BER).

Receive filtering in, for example, cellular receivers such as those in code division multiple access (e.g., CDMA2000), Wideband Code Division Multiple Access (WCDMA), IEEE 802.16d/e (e.g., Worldwide Interoperability for Microwave Access (WiMAX)), Third Generation Partnership Project Long Term Evolution (3GPP LTE) and High-Speed Downlink Packet Access (HSDPA)/High-Speed Uplink Packet Access (HSUPA), is usually partially performed in analog circuits at the front-end and in digital circuits at the back-end. Conventional methods have also used digitized receiver architectures using channel-selection filtering in the digital domain. For example, some conventional methods use a direct conversion receiver, such as "zero-IF" receiver or direct conversion receiver 400, as later shown in FIG. 4.

Figure 2:
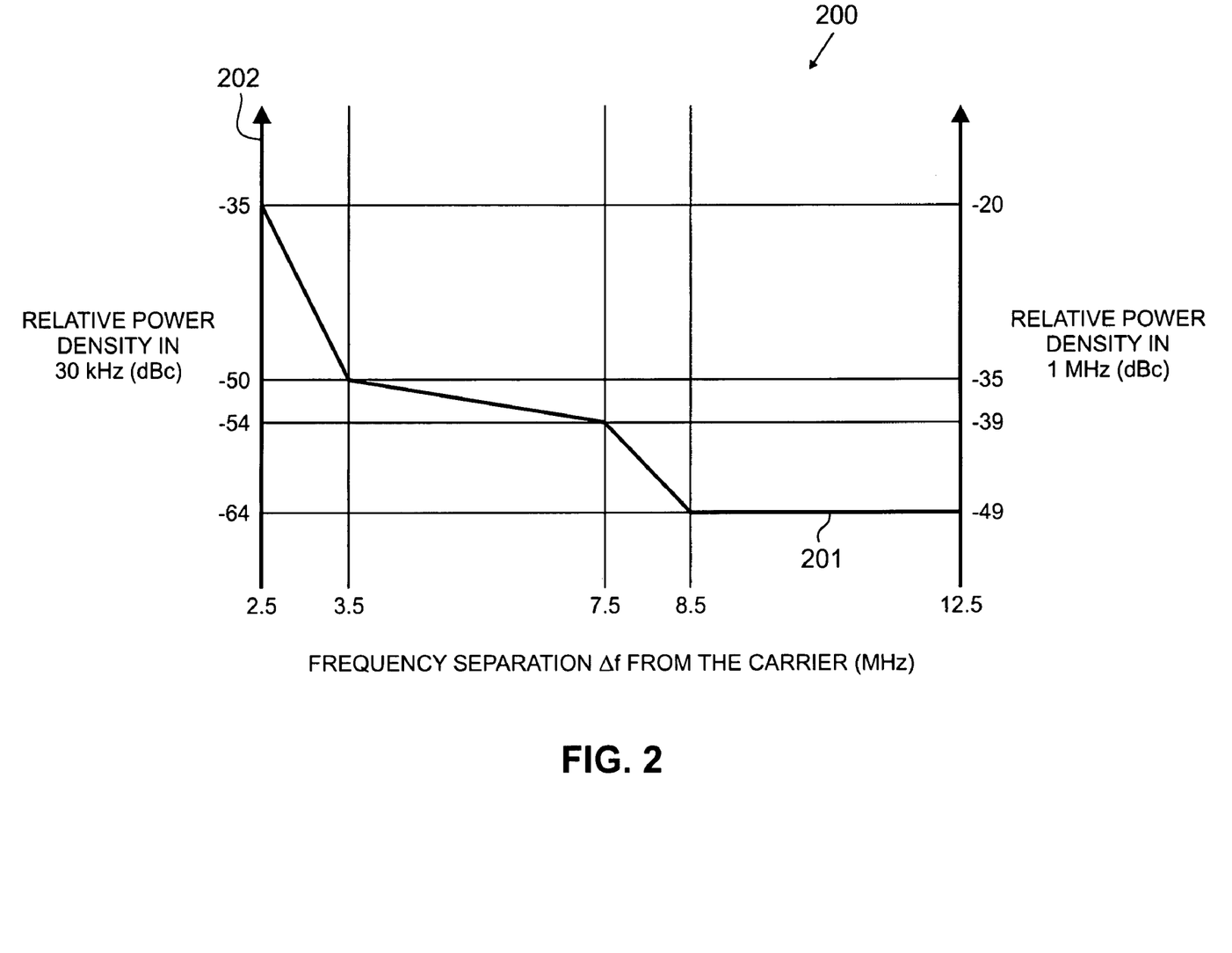
FIG. 2 a spectrum emission mask for a mobile terminal in a 5 MHz channel.

FIG. 2 illustrates spectrum emission mask 200 required by, for example, UMTS for a mobile terminal or mobile station (MS) in a 5 MHz channel for WCDMA or high-speed downlink packet access (HSDPA) signals. Emission mask 200 identifies the maximum allowed power of spurious and noise signals in the spectrum outside the authorized transmission channel. For example, emission mask 200 illustrates that as the relative change in frequency separation from the carrier 201 (the x-axis) increases, the relative power density 202 (the y-axes) decreases.

Figure 3:
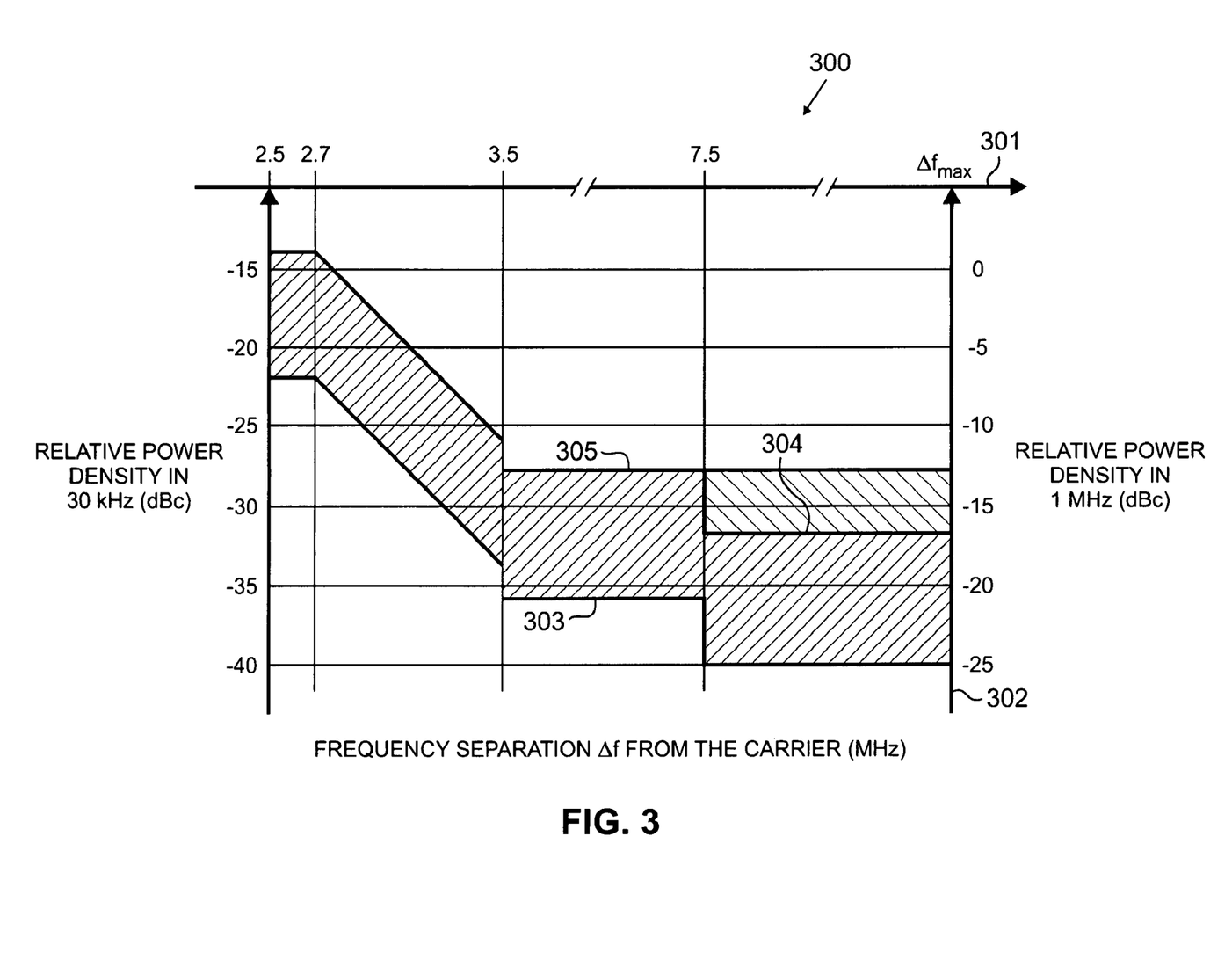
FIG. 3 illustrates a spectrum emission mask for a base transceiver system in a 5 MHz channel.

FIG. 3 illustrates spectrum emission mask 300 required by, for example, UMTS for a base transceiver system (BTS) in a 5 MHz channel for signals in, for example, WCDMA or HSDPA. Spectrum emission mask 300 illustrates that as the relative change in frequency separation from the carrier 301 (the x-axis) increases, the relative power density 302 (the y-axis) decreases. In addition, emission mask 300 identifies the maximum allowed power of spurious and noise signals in the spectrum outside the authorized transmission channel. The different transmit power levels 303, 304 and 305 highlighted in FIG. 2 correspond to different BTS classes or types. The digital filter used in such cases is often a conventional multi-tap filter. The processing required for such filters is typically based on the product of the number of taps (i.e., filter length), the word length (i.e., bits per sample) and coefficient length. Higher symbol rates require proportionately greater processing power and thereby consume more power and generate heat. For MIMO systems, the processing power is even greater and, in fact, is scaled by the multiplier, $n_T$ (i.e, the number of transmit paths).

Base stations and mobile stations adapt the transmit power to maintain a set signal-to-noise ratio (SNR) level at the respective receivers to mitigate any near-far problems. As a result, the nominal power level for base stations and mobile stations is often well below the designated maximum power levels referenced in FIGS. 2 and 3. Furthermore, for signals with a low crest factor in a modulation symbol burst, such as for CDMA, WCDMA or OFDM waveforms, the power level of the burst is well below the designated maximum power levels referenced in FIGS. 2 and 3. Hence, the filtering requirements for out-of-band emissions can be relaxed and the output emissions still meet the required mask.

Figure 4:
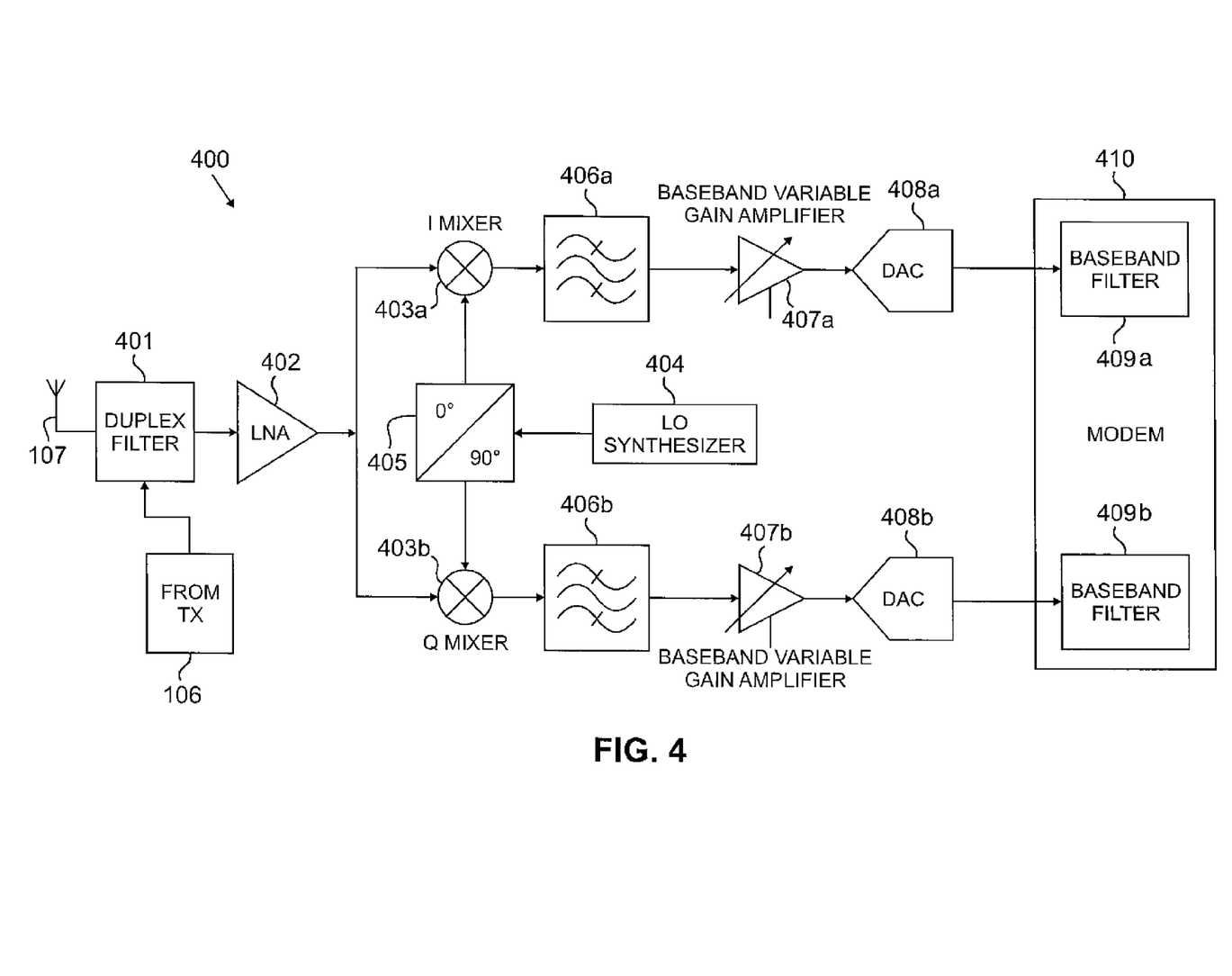
FIG. 4 illustrates a conventional direct conversion receiver.

FIG. 4 illustrates direct conversion receiver 400 includes a duplexer or duplex filter 401 with two inputs. The first input is from antenna 107 and the second input is from transmitter 106. The output of duplex filter 401 is passed to a low noise amplifier (LNA) 402. The output of LNA 402 is passed to a quadrature mixer comprised of an I-component mixer 403a and a Q-component mixer 403b. The input of I-component mixer 403a and Q-component mixer 403b are mixed with a signal generated by local oscillator (LO) synthesizer 404 and shifted by ninety degree phase shifter 405.

The output of I-component mixer 403a is passed through a band pass filter 406a and then through baseband variable gain amplifier 407a. Finally, the output from baseband variable gain amplifier 407a is passed through a digital-to-analog converter (DAC) 408a and sent to baseband filter 409a in modem 410.

Similarly, the output of Q-component mixer 403b is passed through a band pass filter 406b and then through baseband variable gain amplifier 407b. Finally, the output from baseband variable gain amplifier 407b is passed through a digital-to-analog converter (DAC) 408b and sent to baseband filter 409b in modem 410. By eliminating the intermediate frequency (IF) stage in direct conversion receiver 400, there is no longer a need for performing surface acoustic wave (SAW) filtering or for using an IF synthesizer and mixer. Using this methodology, however, all receive filtering takes place in either the analog or digital baseband stages.

Conventional receive filtering in wireless terminals or base transceiver station (BTS) should serve two main purposes. First, receive filtering performs raised root cosine (RRC) filtering to mitigate inter-chip interference (ICI) or ISI. Second, receive filtering provides selectivity to operate in the presence of strong interference. The receiver filter is typically matched to the transmitter RRC filter. In addition, as a worst case interference scenario, a terminal must be able to operate in conformance with certain industry tests in, for example, Universal Mobile Telecommunications System (UMTS) and CDMA2000. However, strong interference is not always present in practice, thus it is desirable to allow for selectivity based on the measured amount of interference.

Conventional applications of adaptive digital receive filter structures typically reduce the number of filter taps and filter coefficients when less selectivity is required. Although the number of required operations per filtered sample is reduced, conventional methods increase ICI for low selectivity. Other conventional methods use modified adaptive digital receive filter structures using optimized sets of filter coefficients with different lengths for a range of selectivity requirements. However, the filter structure often becomes complex and needs to store and load the sets of filter coefficients.

Figure 5:
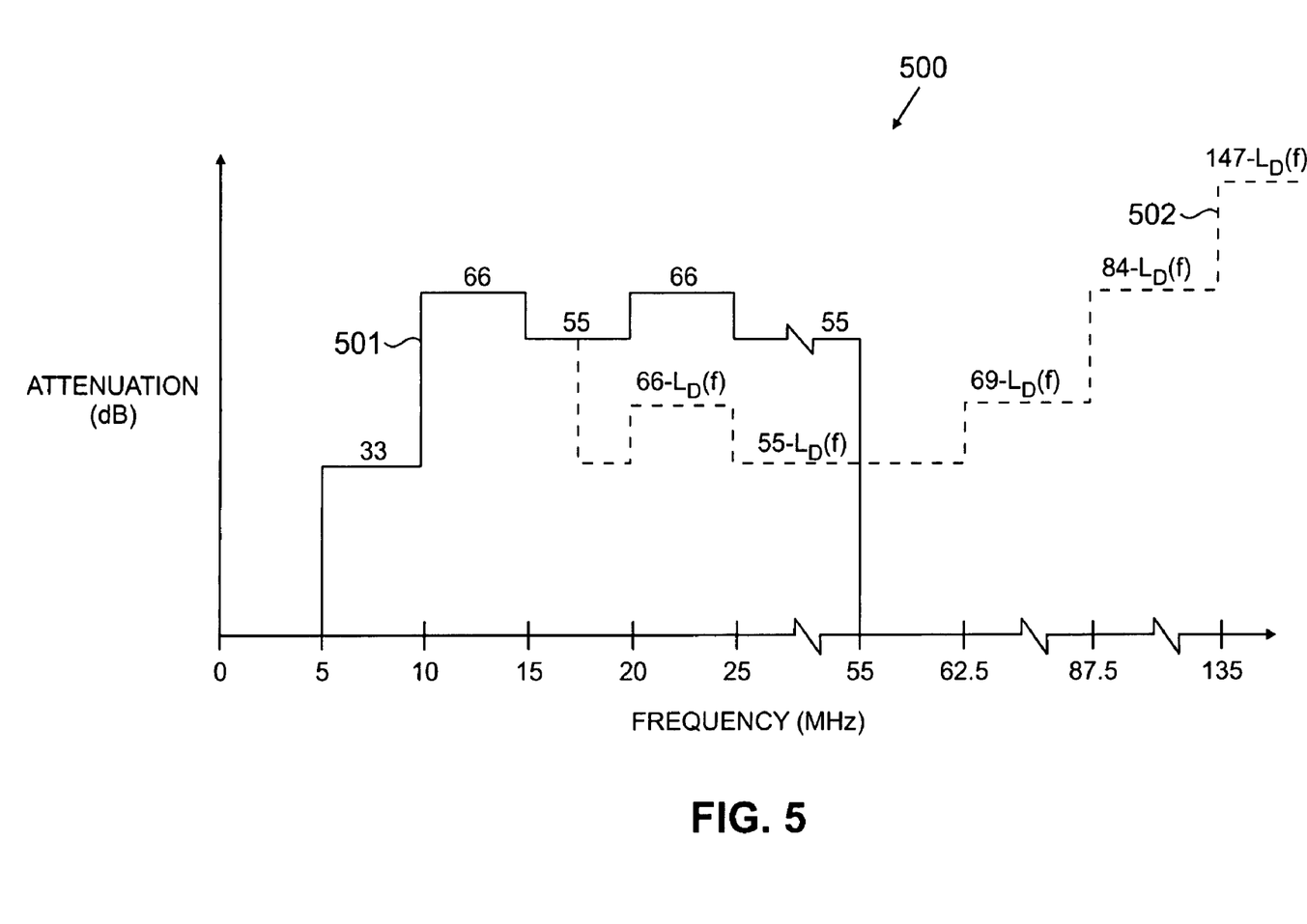
FIG. 5 illustrates a worst case selectivity requirement for an Universal Mobile Telecommunications System (UMTS) receiver as a function of the frequency offset from the center frequency of a desired channel.

FIG. 5 illustrates the worst case UMTS receiver selectivity requirements 500 for adjacent channel selectivity, in-band and out-of-band blocking and intermodulation as a function of the frequency offset from the center frequency of the desired channel. The selectivity requirement within the UMTS downlink band 501 is illustrated as a solid line in FIG. 5, while the out-of-band requirement 502 is illustrated as a dashed line. $L_D(f)$ represents duplexer attenuation for a given frequency determined by the out-of-band duplexer attenuation ($L_{DUP}(f)$) and the in-band duplexer loss ($L_{DUP}$). In highly digitized receiver architectures, the in-band selectivity requirements are satisfied based solely on the digital channel-selection filter. Thus, the digital channel-selection filter will need to provide a stop-band attenuation of 33 dB at a frequency offset of 5 MHz and a stop-band attenuation of 66 dB at frequency offsets of 10 MHz or higher. Moreover, because the entire UMTS downlink signal band 501 has to be converted to the digital domain, a stringent demand on the sampling frequency and dynamic range of the analog-to-digital converter (ADC) exists. For example, in an ADC with a sampling frequency of 153.6 MHz (i.e., 40×chip rate of 3.84 MHz), a dynamic range of more than 66 dB is required.

Figure 6:
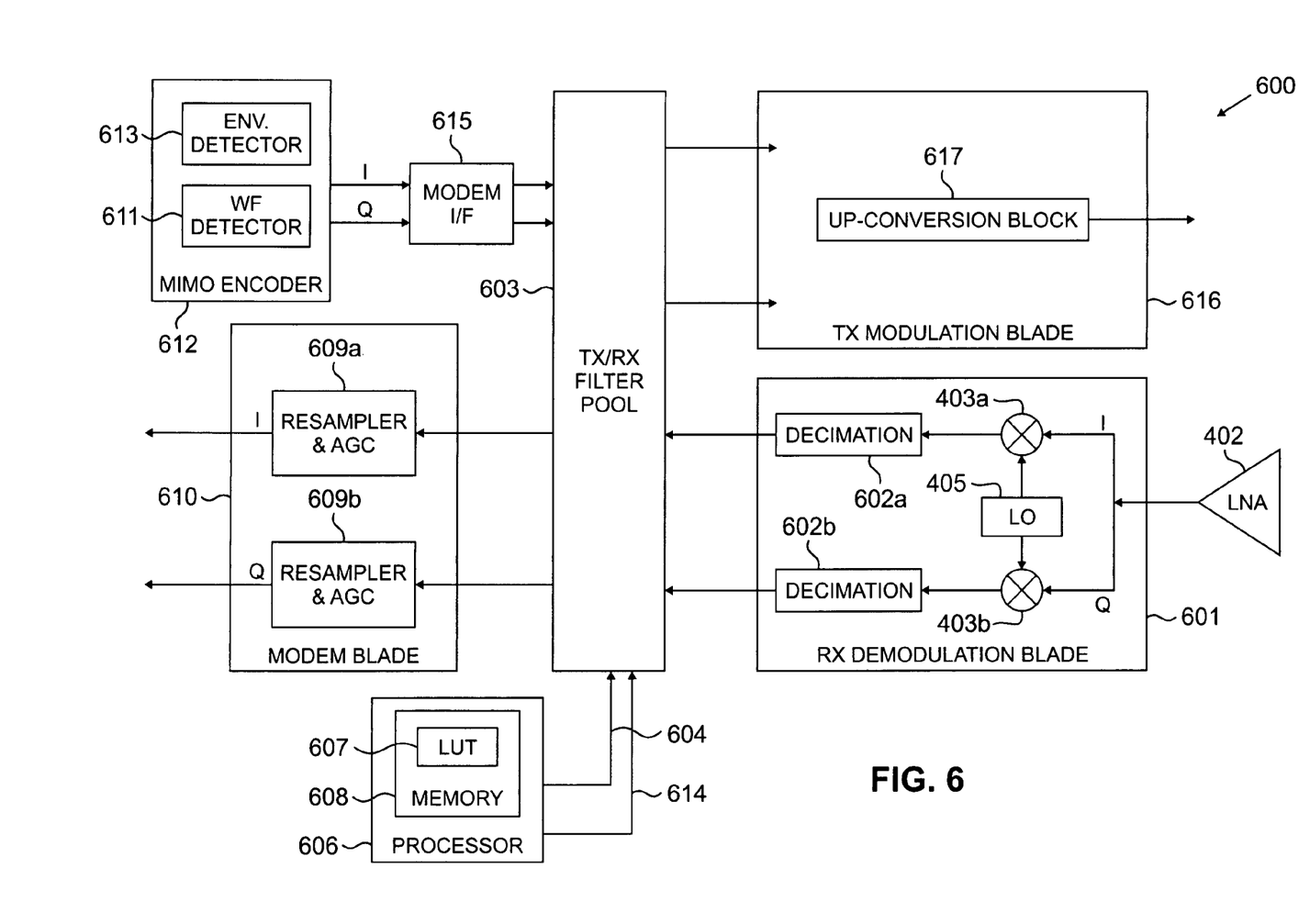
FIG. 6 illustrates the reconfigurable architecture of a pooled digital filter for a wireless MIMO transceiver according to one embodiment of the present disclosure.

FIG. 6 illustrates the reconfigurable architecture of pooled digital filter 600 for use in a wireless MIMO transceiver according to one embodiment of the present disclosure. Although only one transit path and one receive path are illustrated, it should be understood that MIMO transceiver may any number or multiple transmit and receive paths.

First, with respect to a receive path of digital filter 600, the signal output from LNA 402 (described earlier in conjunction with the description accompanying FIG. 4) is passed to an I-component mixer 403a and a Q-component mixer 403b included in modem receiver (RX) demodulation blade 601 and are demodulated. Although FIG. 6 depicts only one modem blade 601 on the receive side, it should be understood that any suitable number of modem blades 601 may be used in accordance with the present disclosure. Thus, embodiments of the present disclosure may simultaneously process several received signals at any given time.

The input of I-component mixer 403a is mixed with a signal generated by LO synthesizer 405. Similarly, the input of Q-component mixer 403b is mixed with a signal generated by LO synthesizer 405. The output of I-component mixer 403a is passed through decimation filter 602a and passed along to transceiver (TX/RX) filter pool 603. Similarly, the output of Q-component mixer 403b is passed through decimation filter 602b and passed along to TX/RX filter pool 603.

TX/RX filter pool 603 processes the signal from decimation filter 602a and 602b using a control signal 604 from reconfigurable processor or digital signal processor 606. Processor 606 may be any suitable reconfigurable processor or part of any suitable reconfigurable processor. In addition, digital filter 600 may include any suitable programmable architecture.

Processor 606 uses an algorithm or a lookup table 607 stored in memory 608 to select the combination of number of taps (filter length), the word length (bits per sample), tap delay and coefficient length to minimize the number of instructions per second and the amount of power consistent with minimizing the adjacent channel interference and the ISI for the waveform being transmitted or received. The size of TX/RX filter pool 603 is chosen to provide enough processing for the average receiver filter pool plus a predefined margin. TX/RX filter pool 603 requirements preferably ensure that requirements for all MIMO streams are met a desired percentage of the time. In addition, processor 606 may include MIMO transmitter matching information in control signal 604.

The parameters of digital filter 600 are set to minimize the number of instructions per second and the amount of power required by digital filter 600 to perform its operation based on the output of the channel estimation algorithm in the modem or the signal strength from resampler and automatic gain control (AGC) modules 609a and 609b found in modem blade 610. Although FIG. 6 depicts only one modem blade 610, it should be understood that any suitable number of modem blades 610 may be used in accordance with the present disclosure. Thus, digital filter 600 may simultaneously process several received signals at any given time.

Now, with respect to a transmit path of digital filter 600, waveform detector 611 detects the power level of the transmitted signal on modulation symbol-by-symbol basis. Waveform detector 611 may be embedded in the modem, MIMO encoder 612 or may be implemented as a separate, external function in a field programmable gate array (FPGA) or application-specific integrated circuit (ASIC). Waveform detector 611 may be any suitable detector in accordance with the present disclosure.

Processor 606 uses the output of envelope detector 613 to set parameters of digital filter 600 to minimize the number of instructions per second and the amount of power required by digital filter 600 to perform. As with the receive side, processor 606 uses an algorithm or a lookup table 607 stored in memory 608 to select the combination of filter parameters (such as the number of taps (filter length), the word length (bits per sample), tap delay and coefficient length).

In one embodiment according to the present disclosure, the filter parameters are chosen to minimize the number of instructions per second. Processor 606 may use any suitable algorithm to select the combination of filter parameters in accordance with the present disclosure. In addition, the chosen parameter values should keep the power level consistent with minimizing the inter-symbol interference (ISI) for the waveform being transmitted. Processor 606 may select any combination of filter parameters to achieve a desired efficiency or as is required. For example, processor 606 may set the delay parameters and the tap coefficients and accordingly sends a processor control signal 614 to TX/RX filter pool 603. In addition, processor 606 may include MIMO receiver matching information in control signal 614.

After the signal has been encoded in MIMO encoder 612, the outgoing I and Q data streams for each stream are passed to its respective modem interface (I/F) blade 615. Although I and Q data streams for only one substream are shown in FIG.

6, any suitable number of substreams may be used. After being processing in modem I/F 615, the signals are passed to TX/RX filter pool 603.

TX/RX filter pool 603 processes the MIMO stream according to the received processor control signal 614. Specifically, TX/RX filter pool 603 adaptively adjusts the filter parameters based on the signal waveform characteristics previously ascertained and accounted for by processor 606. After passing through TX/RX filter pool 603, the data streams are recombined and modulated in modulation blade 616 by up-conversion block 617. The filtered signal is then passed along to a pulse amplitude modulation (PAM) module (not shown). It should be understood that in embodiments of the present disclosure, digital filter 600 may simultaneously process several transmitted signals at any given time.

According to one embodiment of the present disclosure, digital filter 600 automatically adjusts filter parameters (i.e., number of taps or filter length, word length, coefficient quantization, sampling rate, tap delay, sampling bits, etc.) based on signal waveform characteristics. The adjustments provide adjacent channel rejection and meet bit error rate or symbol error rate requirements. The adjustments also preferably match digital filter 600 to any known transmitter and/or receiver pulse-shaping filters.

Accordingly, digital filter 600 reduces processing power and power dissipation for multiple receiver and/or transmitter MIMO streams of modulation symbols. Digital filter 600 may be used in any suitable wireless network such as, for example, systems employing CDMA, WCDMA, Orthogonal Frequency Division Multiplexing (OFDM), Orthogonal Frequency Division Multiple Access (OFDMA) technologies, or the like.

Figure 7:
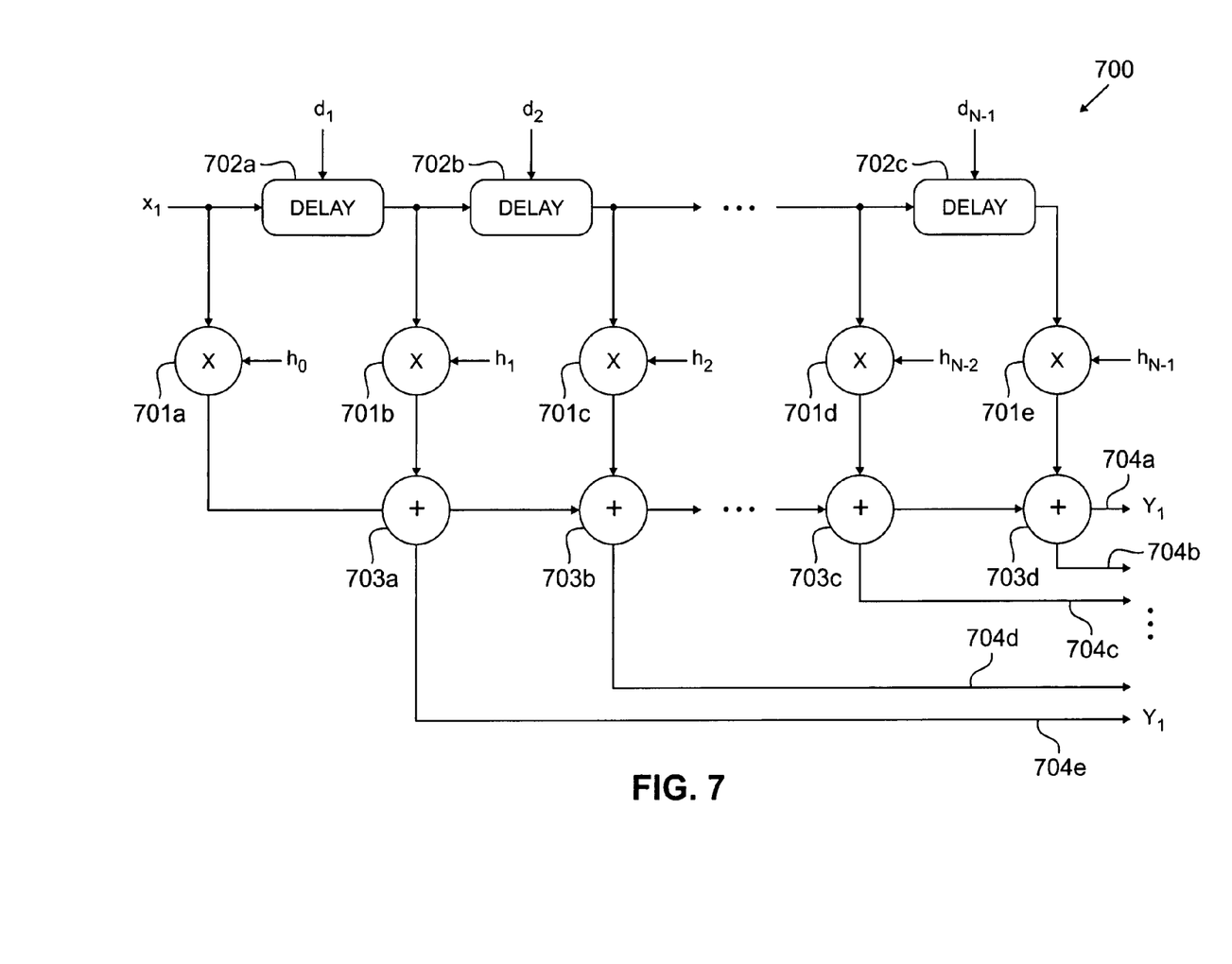
FIG. 7 illustrates an adaptive finite impulse response (FIR) filter in accordance with one embodiment of the present disclosure.

FIG. 7 illustrates reconfigurable FIR filter 700 in accordance with one embodiment of the present disclosure. FIR filter 700 includes tap coefficient set $\{h_0, h_1, \ldots, h_{N-1}\}$ 701a, 701b, 701c, 701d and 701e (collectively referred to herein as tap coefficient set 701). Although only five tap coefficient sets 701 are shown in FIG. 7, any suitable number of tap coefficient sets 701 may be used in accordance with the present disclosure. FIR filter 700 also includes a delay set $\{d_1, \ldots, d_{N-1}\}$ 702a, 702b and 702c (collectively referred to herein as delay set 702). Although only three delay sets 702 are shown in FIG. 7, any suitable number of delay sets may be used in accordance with the present disclosure.

FIR filter 700 further includes tap output set $\{y_1, \ldots, y_{N-1}\}$ 703a, and 703b, 703c, and 703d (collectively referred to herein as tap output set 703). Although four tap output sets 703 are shown in FIG. 7, any suitable number of tap output sets 703 may be used. As described earlier, processor 606 sets the delay parameters and the tap coefficients and accordingly produces a processor control signals 604 and 614, as described above herein. In one embodiment, the number of taps used is determined by the selection of the respective output port 704a, 704b, 704c, 704d and 704e (collectively referred to herein as output port 704) from tap output set {Y} 703. Although five output ports 704 are shown in FIG. 7, any suitable number of output ports may be used.

Figure 8A:
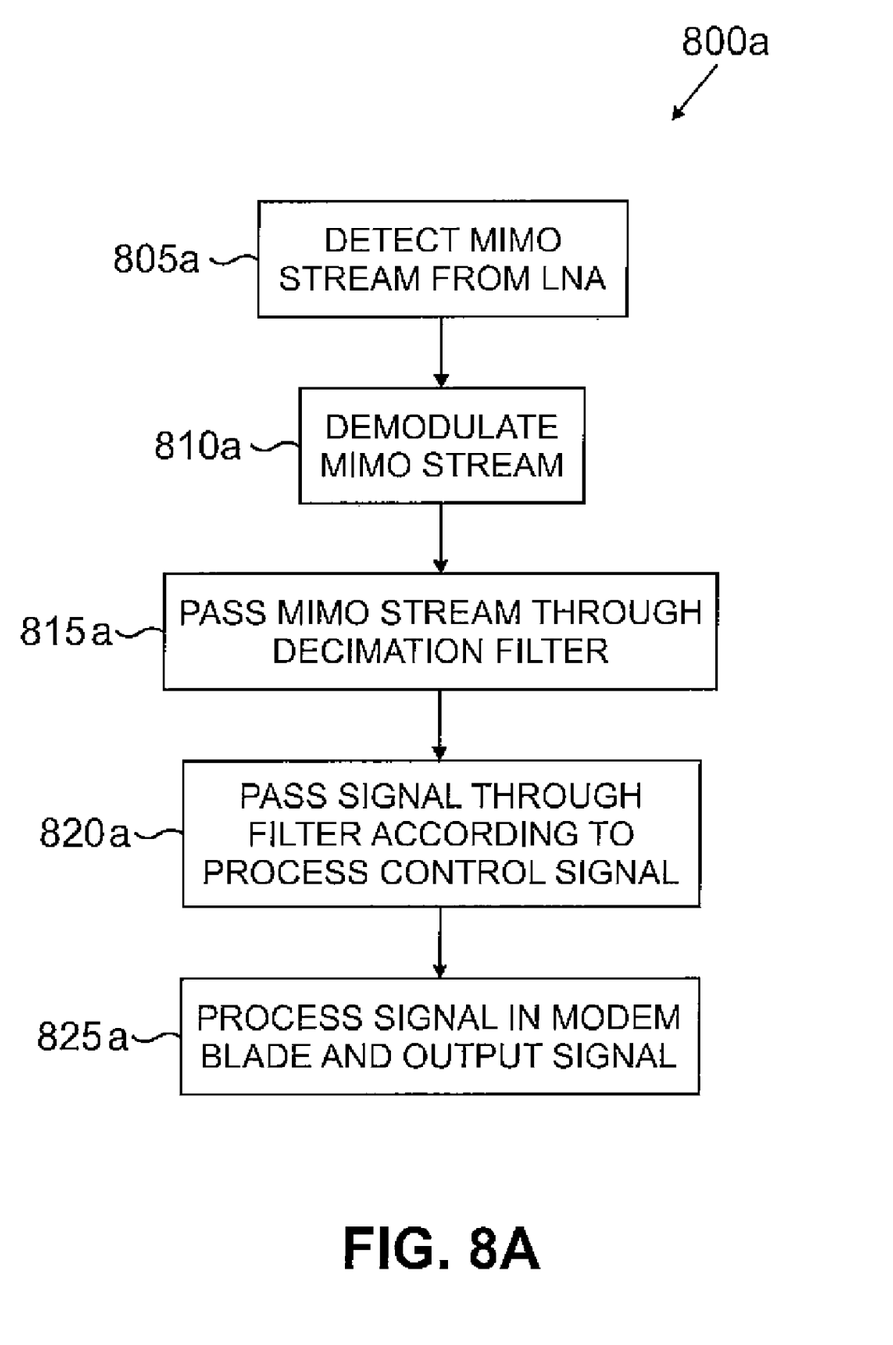
FIGS. 8A and 8B are somewhat simplified flow charts illustrating a method for filtering a MIMO system transceiver in accordance with one embodiment of the present disclosure.

FIG. 8A is a somewhat simplified flow chart illustrating method 800a for pooled-filtering of signals in a MIMO transceiver in a receive mode. In step 805a, the signal output from a low noise amplifier, such as LNA 402 (described earlier in conjunction with the description accompanying FIG. 4), is detected by digital filter 600. The signal is passed to an I-component mixer, such as I-component mixer 403a, and a Q-component mixer, such as Q-component mixer 403b in step 810a. The input of I-component mixer 403a is mixed with a signal generated by local oscillator, such as LO synthesizer 405. Similarly, the input of Q-component mixer 403b is mixed with a signal generated by LO synthesizer 405.

In step 815a, the mixed output of I-component mixer 403a is passed through a decimation filter, such as decimation filter 602a, and passed along to a reconfigurable receiver filter pool, such as TX/RX filter pool 603. Similarly, the mixed output of Q-component mixer 403b is passed through a decimation filter, such as decimation filter 602b, and passed along to TX/RX filter pool 603.

In step 820a, TX/RX filter pool 603 processes the signal according to a process control signal, such as process control signal 604. Process control signal 604 selects the various process control or filter parameters according to predetermined criteria such as, for example, ISI, power consumption of the reconfigurable filter pool and the number of instructions performed by TX/RX filter pool 603. The predetermined criteria may be referenced from a lookup table, such as look up table 607, stored in memory 608. The predetermined criteria may be met by selecting a combination of parameters such as, for example, a number of taps, a filter length, a word length, a coefficient quantization, a sampling rate, bits per sample, a sampling bit, a tap delay and a coefficient length. Process control signal 604 may also include MIMO transmitter matching information. The signal is then processed in a modem blade, such as modem blade 610, in step 825a, using a resampler and automatic gain control module, such as resampler and AGC module 609a and 609b.

Figure 8B:
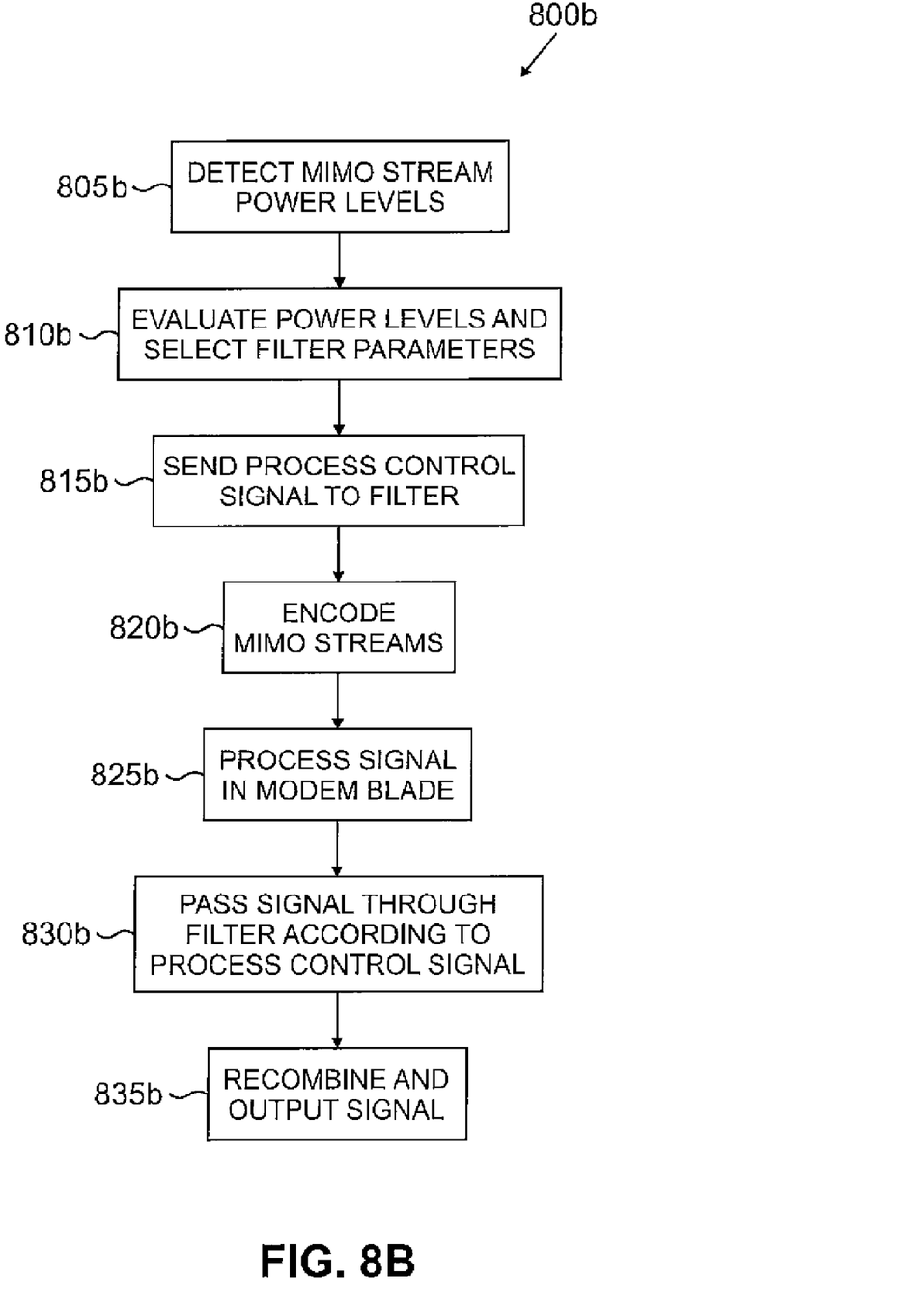

FIG. 8B is a somewhat simplified flow chart illustrating method 800b for pooled-filtering of signals in a MIMO transceiver in a transmit mode. In step 805b, a waveform detector, such as waveform detector 611, detects the respective power levels of one or more transmitted MIMO streams on a symbol-by-symbol basis.

In step 810b, a processor, such as processor 606, evaluates the respective power levels and MIMO streams. Processor 606 generates a process control signal, such as process control signal 614. Process control signal 614 selects the various process control or filter parameters according to predetermined criteria such as, for example, inter-symbol interference, power consumption of the reconfigurable filter pool and the number of instructions performed by the reconfigurable filter pool. The predetermined criteria may be referenced from a lookup table, such as look up table 607 stored in memory 608. The predetermined criteria may be met by selecting a combination of parameters such as, for example, a number of taps, a filter length, a word length, a coefficient quantization, a sampling rate, bits per sample, a sampling bit, a tap delay and a coefficient length. In step 815b, processor 606 sends a process control signal 614 to a reconfigurable filter pool, such as TX/RX filter pool 603.

After processor 606 generates a process control signal 614, the MIMO signals are encoded in an encoder, such as MIMO encoder 612, in step 820b. The encoded signal is passed on to and processed in a modem interface (I/F), such as modem I/F 615, in step 825b. In step 830b, the signal is passed to TX/RX filter pool 603, where the signal is filtered according to process control signal 614 from processor 606. The data streams are recombined and modulated in a modulation blade, such as modulation blade 616 and finally ready for output to a PAM module in step 835b.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless transceiver, a method for providing adaptive digital filtering comprising:
   selecting a combination of filter parameter values in a filter pool according to at least one of a channel estimation algorithm and a signal characteristic, the filter pool being configured to process received signals and transmitted signals;
   configuring a filter according to the combination of filter parameter values, the filter being a reconfigurable adaptive filter, the configuration matching the filter to at least one known transmitter and/or receiver pulse-shaping filter and meeting bit error rate or symbol rate requirements; and
   matching the filter to at least one of: a receiver filter and a transmitter filter.

2. The method of claim 1, wherein selecting the combination of filter parameter values minimizes inter-symbol interference.

3. The method of claim 1, wherein the selecting the combination of filter parameter values minimizes adjacent channel interference.

4. The method of claim 1, wherein selecting the combination of filter parameter values minimizes power consumption of a filter.

5. The method of claim 1, wherein selecting the combination of filter parameter values minimizes the number of instructions performed by a filter.

6. The method of claim 1, wherein selecting the combination of filter parameter values is accomplished using a lookup table.

7. The method of claim 1, wherein the filter parameter values are at least one of: a number of taps, a filter length, a word length, a coefficient quantization, a sampling rate, bits per sample, a sampling bit, a tap delay and a coefficient length.

8. The method of claim 1, wherein the filtering achieves a desired efficiency.

9. The method of claim 1, wherein the filter comprises a reconfigurable digital signal processor.

10. The method of claim 1, wherein the transceiver is a multi-input, multi-output (MIMO) transceiver.

11. For use in a wireless communication system, a multi-input, multi-output (MIMO) transceiver filter comprising:
    a processor to select a combination of filter parameter values according to signal strength information and to match a MIMO receiver filter to a MIMO transmitter filter, wherein the filter is a reconfigurable adaptive filter configured to match the MIMO receiver filter to at least one known MIMO receiver pulse-shaping filter and meet bit error rate or symbol rate requirements; and
    a reconfigurable filter pool to filter a signal according to the combination of filter parameters, the filter pool being configured to process received signals and transmitted signals.

12. The filter of claim 11, wherein the combination of filter parameter values minimizes inter-symbol interference.

13. The filter of claim 11, wherein the combination of filter parameter values minimizes power consumption of the reconfigurable filter pool.

14. The filter of claim 11, wherein the combination of filter parameter values minimizes the number of instructions performed by the reconfigurable filter pool.

15. The filter of claim 11, wherein the processor selects the combination of filter parameter values using a lookup table.

16. The filter of claim 11, wherein the filter parameter values are at least one of: a number of taps, a filter length, a word length, a coefficient quantization, a sampling rate, bits per sample, a sampling bit, a tap delay and a coefficient length.

17. The filter of claim 11, wherein the combination of filter parameter values achieves a desired efficiency.

18. The filter of claim 11, wherein the reconfigurable filter pool comprises a pool of reconfigurable digital signal processors.

19. For use in a multi-input, multi-output (MIMO) system, a transceiver filter comprising:
    a processor to select a combination of filter parameter values according to a channel estimation algorithm and to match a receiver filter to at least one of: a MIMO receiver filter and a MIMO transmitter filter, wherein the receiver filter is a reconfigurable adaptive filter and wherein the filter parameters that match the receiver filters matches least one known transmitter and/or receiver pulse-shaping filter and meets bit error rate or symbol rate requirements; and
    a reconfigurable filter pool to filter a MIMO stream according to the combination of filter parameters, the filter pool being configured to process received signals and transmitted signals.

20. The filter of claim 19, wherein the combination of filter parameter values minimizes at least one of: an inter-symbol interference, a power consumption of the reconfigurable filter pool, an adjacent channel interference and a number of instructions performed by the reconfigurable filter pool.

21. The filter of claim 19, wherein the processor selects the combination of filter parameter values using a lookup table.

22. The filter of claim 19, wherein the filter parameter values are at least one of: a number of taps, a filter length, a word length, a coefficient quantization, a sampling rate, bits per sample, a sampling bit, a tap delay and a coefficient length.

23. The filter of claim 19, wherein the combination of filter parameter values achieves a desired efficiency.

24. The filter of claim 19, wherein the reconfigurable filter pool comprises a pool of reconfigurable digital signal processors.

* * * * *